US012170751B2

(12) United States Patent
Mukai et al.

(10) Patent No.: US 12,170,751 B2
(45) Date of Patent: Dec. 17, 2024

(54) INFORMATION PROCESSING DEVICE FOR PROCESSING PRINTING JOB, INFORMATION PROCESSING SYSTEM FOR PROCESSING PRINTING JOB, AND INFORMATION PROCESSING METHOD FOR PROCESSING PRINTING JOB

(71) Applicant: SEIKO EPSON CORPORATION, Tokyo (JP)

(72) Inventors: Yuji Mukai, Nagano (JP); Yasuhiro Oshima, Nagano (JP); Yasuhiro Furuta, Shimosuwa-machi (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 18/192,261

(22) Filed: Mar. 29, 2023

(65) Prior Publication Data

US 2023/0319216 A1 Oct. 5, 2023

(30) Foreign Application Priority Data

Mar. 31, 2022 (JP) ................. 2022-058550

(51) Int. Cl.
*H04N 1/34* (2006.01)
*G06F 3/12* (2006.01)
*H04N 1/23* (2006.01)
*H04N 1/44* (2006.01)

(52) U.S. Cl.
CPC .......... *H04N 1/346* (2013.01); *G06F 3/1207* (2013.01); *G06F 3/1273* (2013.01); *G06F 3/1292* (2013.01); *H04N 1/2376* (2013.01); *H04N 1/344* (2013.01)

(58) Field of Classification Search
CPC ...... H04N 1/346; H04N 1/2376; H04N 1/344; G06F 3/1207; G06F 3/1273; G06F 3/1292
See application file for complete search history.

(56) References Cited

U.S. PATENT DOCUMENTS

| | | | |
|---|---|---|---|
| 2013/0194623 A1* | 8/2013 | Tecu ................... | G06F 3/1204 358/1.15 |
| 2016/0054958 A1 | 2/2016 | Togashi et al. | |
| 2017/0272586 A1* | 9/2017 | Takeuchi ............. | H04N 1/344 |
| 2017/0366708 A1* | 12/2017 | Yamaguchi .......... | H04N 1/4426 |
| 2018/0293032 A1* | 10/2018 | Hakamata ............ | G06F 3/1288 |
| 2021/0232878 A1* | 7/2021 | Takaoka .............. | G06F 3/1219 |
| 2022/0317939 A1* | 10/2022 | Okuno ................ | G06F 3/1229 |

FOREIGN PATENT DOCUMENTS

JP 2016-045683 A 4/2016

* cited by examiner

*Primary Examiner* — Iriana Cruz
(74) *Attorney, Agent, or Firm* — Global IP Counsellors, LLP (57) ABSTRACT

An information processing device includes: a first communicator that receives a printing job including user information; a storage that stores the printing job received by the first communicator; a second communicator that receives a printing request including the user information and identification information of a printing device; a controller that acquires, from the storage, the printing job including the user information included in the printing request and sets a destination of the acquired printing job to the printing device corresponding to the identification information of the printing device included in the printing request; and a management unit that manages printing usage information for each of one or more pieces of user information, in which the second communicator transmits the printing job.

11 Claims, 9 Drawing Sheets

ID PROCESSING DEVICE FOR
PROCESSING PRINTING JOB,
INFORMATION PROCESSING SYSTEM FOR
PROCESSING PRINTING JOB, AND
INFORMATION PROCESSING METHOD
FOR PROCESSING PRINTING JOB

The present application is based on, and claims priority from JP Application Serial Number 2022-058550, filed Mar. 31, 2022, the disclosure of which is hereby incorporated by reference herein in its entirety.

BACKGROUND

1. Technical Field

The present disclosure relates to an information processing device, an information processing system, and an information processing method.

2. Related Art

With more and more people working from home or in flexible offices, there are more and more opportunities for distributed printing, where company documents need to be printed using nearby printers inside and outside a company. A telecommuting user may instruct a terminal device to print a document.

In a printing system described in JP-A-2016-045683, a user can operate any printer registered on a server to perform printing without restriction (see JP-A-2016-045683).

However, with the technology described in JP-A-2016-045683, an administrator cannot impose restrictions on printing by a user or manage billing.

SUMMARY

An information processing device according to an aspect includes: a first communication unit that receives a printing job including user information; a storage unit that stores the printing job received by the first communication unit; a second communication unit that receives a printing request including the user information and identification information of a printing device; a control unit that acquires, from the storage unit, the printing job including the user information included in the printing request and sets a destination of the acquired printing job to the printing device corresponding to the identification information of the printing device included in the printing request; and a management unit that manages printing usage information for each of one or more pieces of user information. The second communication unit transmits the printing job.

An information processing system according to an aspect includes: a terminal device; a mobile terminal; and an information processing device that performs communication with the terminal device and the mobile terminal. The terminal device creates a printing job including user information and transmits the created printing job to the information processing device, the mobile terminal creates a printing request including the user information and an identification information of a printing device and transmits the created printing request to the information processing device, the information processing device includes a first communication unit that receives the printing job, a storage unit that stores the printing job received by the first communication unit, a second communication unit that receives the printing request, a control unit that acquires, from the storage unit, the printing job including the user information included in the printing request and sets a destination of the acquired printing job to the printing device corresponding to the identification information of the printing device included in the printing request, and a management unit that manages printing usage information for each of one or more pieces of user information, and the second communication unit transmits the printing job.

An information processing method according to an aspect is executed by an information processing system including a terminal device, a mobile terminal, and an information processing device that performs communication with the terminal device and the mobile terminal. The information processing method includes: creating, by the terminal device, a printing job including user information and transmitting, by the terminal device, the created printing job to the information processing device; creating, by the mobile terminal, a printing request including the user information and an identification information of a printing device and transmitting, by the mobile terminal, the created printing request to the information processing device; and, by the information processing device, receiving the printing job, storing the received printing job in a storage unit, receiving the printing request, acquiring, from the storage unit, the printing job including the user information included in the printing request, setting a destination of the acquired printing job to the printing device corresponding to the identification information of the printing device included in the printing request, transmitting the printing job, and managing printing usage information for each of one or more pieces of user information.

DESCRIPTION OF EXEMPLARY EMBODIMENTS

A first embodiment will be described. In the present embodiment, a company is shown as an example of an organization to which a user belongs, but the present disclosure may be applied to other organizations.

Figure 1:
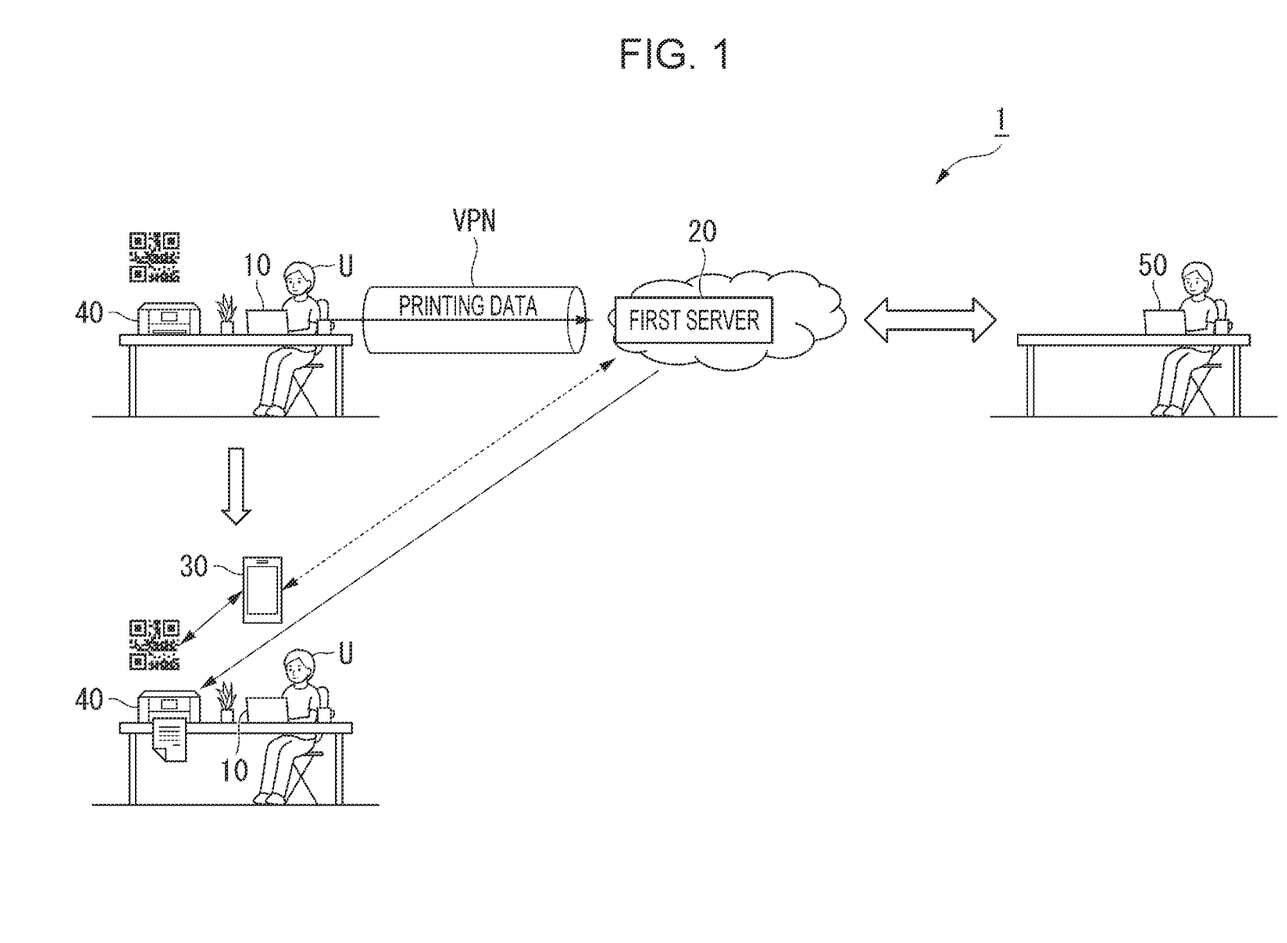
FIG. 1 is a diagram illustrating an example of a first information processing system according to a first embodiment.

FIG. 1 is a diagram illustrating an example of a first information processing system 1 according to the first embodiment. The first information processing system 1 includes a terminal device 10, a first server 20, a user terminal 30, a printing device 40, and a management terminal 50. The terminal device 10, the first server 20, and the management terminal 50 communicate with one another via a network NW. Examples of the network NW include the Internet, a wide area network (WAN), a local area network (LAN), a provider device, a wireless base station, and the like. The terminal device 10 and the first server 20 are connected by a virtual private network (VPN), for example.

A user U uses the terminal device 10 and the printing device 40 at a place outside the company, such as at home. The user U creates a registration request for registering the printing device 40 in the first server 20 by operating the terminal device 10, and transmits the created registration request to the first server 20. The registration request includes user information, identification information of the printing device 40, and address information of the printing device 40.

The first server 20 receives the registration request transmitted by the terminal device 10 and acquires the user information, the identification information of the printing device 40, and the address information of the printing device 40 included in the received registration request. The first server 20 creates an image such as a quick response (QR) code (registered trademark) representing the acquired user information and an address of the first server 20. In the following, a case of using the QR code as an example of the image will be described. The first server 20 creates a registration response including the created QR code and transmits the created registration response to the terminal device 10. The terminal device 10 receives the registration response transmitted by the first server 20. The user U acquires the QR code included in the registration response received by the terminal device 10. The user U may print the QR code acquired by the terminal device 10 and attach the QR code to the printing device 40.

The user U installs an authentication application on the user terminal 30, activates the installed authentication application, and registers the user information. The management terminal 50 sets a virtual printer that can be used by the terminal device 10 to perform printing via the VPN based on the registration request transmitted by the terminal device 10. The first server 20 associates identification information of the set virtual printer with the user information, the identification information of the printing device 40, and the address information of the printing device 40 included in the registration request. The management terminal 50 sets, for the first server 20, a user restriction and billing status of the printing device in association with the user information.

The terminal device 10 establishes VPN connection with the first server 20. The terminal device 10 creates a printing job including the user information and printing data, and transmits the created printing job to the first server 20. The first server 20 receives the printing job transmitted by the terminal device 10, and spools the printing data to the virtual printer associated with the user information based on the user information and the printing data included in the received printing job.

The user terminal 30 acquires the user information and the address of the first server 20 by reading the QR code. The user terminal 30 creates a printing request addressed to the address of the first server 20 and including the acquired user information, and transmits the created printing request to the first server 20.

The first server 20 determines whether or not there is a virtual printer associated with the user information based on the user information included in the printing request transmitted by the user terminal 30. When the first server 20 determines that there is a virtual printer associated with the user information, the first server 20 creates the printing job addressed to the printing device 40 and including the printing data spooled to the virtual printer associated with the user information. The first server 20 transmits the created printing job to the printing device 40. The printing device 40 receives the printing job transmitted by the first server 20 and performs printing by processing the printing data included in the received printing job. The first server 20 calculates a printing charge based on usage information such as a printing history managed in association with the user information, and performs billing processing.

Figure 2:
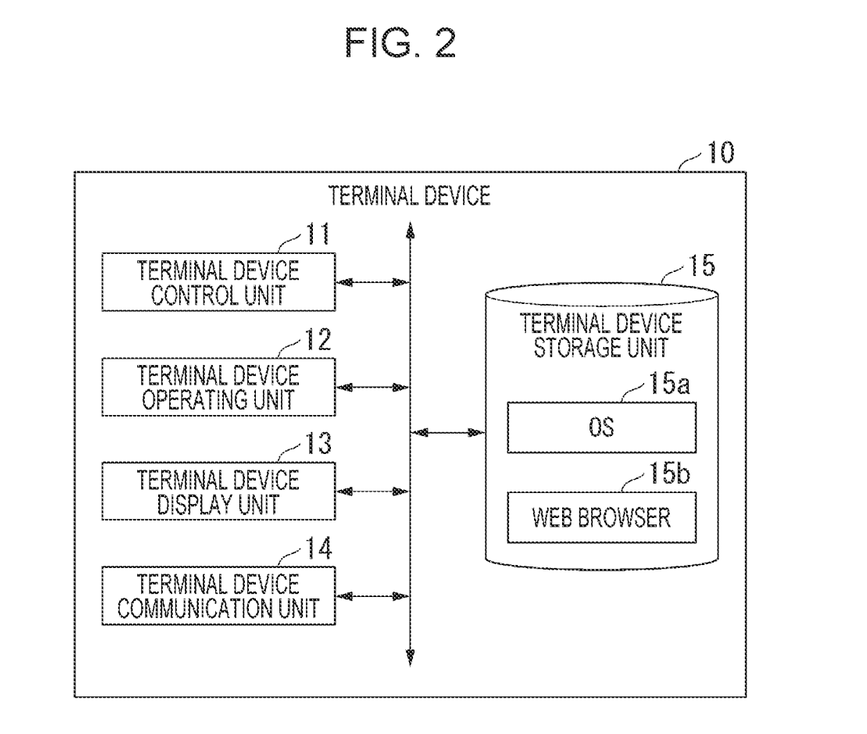
FIG. 2 is a block diagram illustrating a hardware configuration of a terminal device.

Next, hardware configurations of the terminal device 10, the first server 20, the user terminal 30, and the printing device 40 will be described with reference to FIGS. 2 to 5. FIG. 2 is a block diagram illustrating the hardware configuration of the terminal device 10. The terminal device 10 includes a terminal device control unit 11, a terminal device operating unit 12, a terminal device display unit 13, a terminal device communication unit 14, and a terminal device storage unit 15.

The terminal device control unit 11 includes a processor such as a central processing unit (CPU), a read only memory (ROM), a random access memory (RAM), and the like, and controls each unit in the terminal device. The terminal device control unit 11 creates the registration request for registering the printing device 40 in the first server 20 and transmits the created registration request to the first server 20 through the terminal device communication unit 14. The registration request includes the user information, the identification information of the printing device 40, and the address information of the printing device 40. The terminal device control unit 11 acquires the registration response from the terminal device communication unit 14 and acquires the QR code included in the acquired registration response. The terminal device control unit 11 causes the terminal device communication unit 14 to establish VPN connection with the first server 20. The terminal device control unit 11 creates the printing job including the user information and the printing data, and causes the terminal device communication unit 14 to transmit the created printing job to the first server 20.

The terminal device operating unit 12 is, for example, a keyboard and a mouse, and is used for operations such as an operation of inputting the user information, the identification information of the printing device 40, and the address information of the printing device 40 included in the registration request, and for an operation for transmitting the printing job to the first server 20. The terminal device display unit 13 is, for example, a liquid crystal display, and displays various types of information such as a setting screen for printing by the printing device 40. The terminal device communication unit 14 communicates with the first server 20 via the network NW.

The terminal device storage unit 15 is, for example, a hard disk drive (HDD), and stores an operating system (OS) 15*a*, a web browser 15*b*, and the like. The OS 15*a* is basic software for operating various application programs. The web browser 15*b* is an application program for displaying web pages. The terminal device control unit 11 causes the terminal device display unit 13 to display various types of information such as a registration screen for registering the printing device 40 by using the web browser 15*b*. The various types of information is provided by the first server 20 as a web page.

Figure 3:
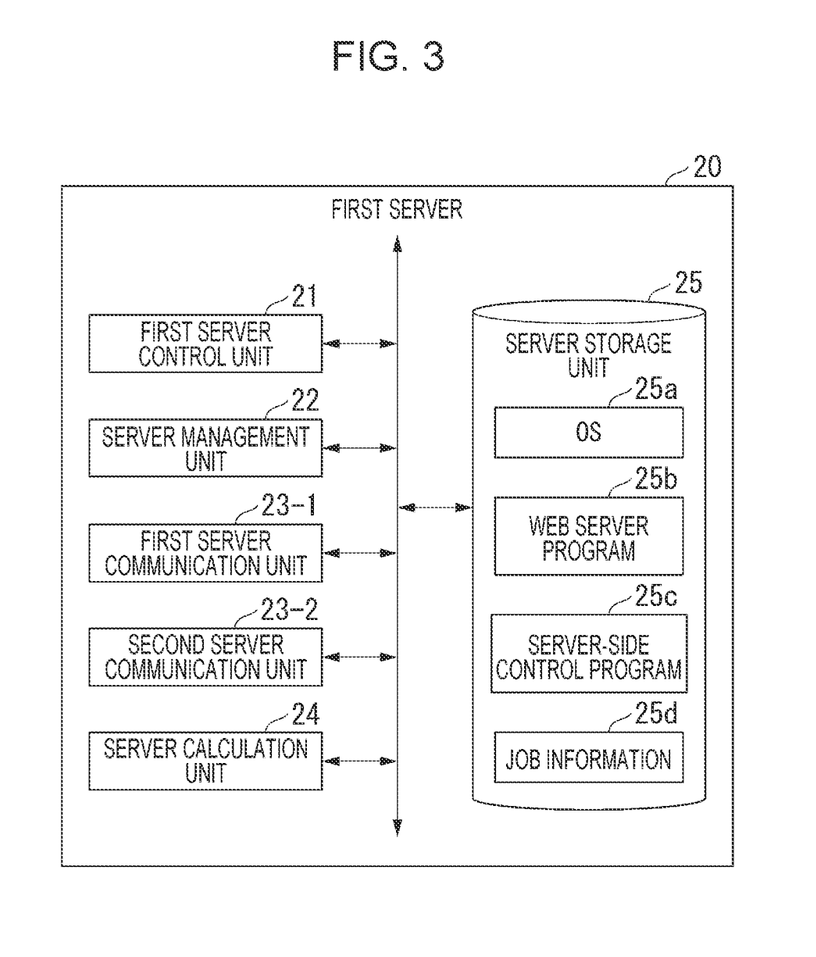
FIG. 3 is a block diagram illustrating a hardware configuration of a first server.

FIG. 3 is a block diagram illustrating the hardware configuration of the first server 20. The first server 20 includes a first server control unit 21, a server management unit 22, a first server communication unit 23-1, a second server communication unit 23-2, a server calculation unit 24, and a server storage unit 25.

The first server control unit 21 includes a processor such as a CPU, a ROM, a RAM, and the like, and controls each unit in the first server 20. The first server control unit 21 acquires the registration request from the first server communication unit 23-1 and acquires the user information, the identification information of the printing device 40, and the address information of the printing device 40 included in the acquired registration request. The first server control unit 21 creates the QR code representing the acquired user information and the address of the first server 20. The first server control unit 21 creates the registration response including the created QR code and transmits the created registration response to the terminal device 10 through the first server communication unit 23-1. The first server control unit 21 sets the virtual printer to which the printing job transmitted from the terminal device 10 via the VPN is to be spooled based on the registration request. The first server control unit 21 associates the identification information of the set virtual printer with the user information, the identification information of the printing device 40, and the address information of the printing device 40 included in the registration request. The first server control unit 21 sets the user restriction and billing status of the printing device in association with the user information.

The first server control unit 21 acquires the printing job from the first server communication unit 23-1 and spools the printing job to the virtual printer associated with the user information based on the user information and the printing data included in the acquired printing job. The first server control unit 21 acquires the printing request from the second server communication unit 23-2 and determines whether or not there is a virtual printer associated with the user information based on the user information included in the acquired printing request. When the first server control unit 21 determines that there is a virtual printer associated with the user information, the first server control unit 21 changes a destination of the printing job spooled to the virtual printer associated with the user information to the printing device 40. The first server control unit 21 transmits the printing job with the changed destination to the printing device 40 through the second server communication unit 23-2.

The server management unit 22 manages printing usage information for each of one or more pieces of user information. The first server communication unit 23-1 communicates with the terminal device 10 and the management terminal 50 via the network NW. The second server communication unit 23-2 communicates with the user terminal 30 via the network NW. The server calculation unit 24 calculates the printing charge based on the printing usage information managed by the server management unit 22 to perform billing processing.

The server storage unit 25 is, for example, an HDD, stores an OS 25a, a web server program 25b, a server-side control program 25c, job information 25d, and the like. The OS 25a is basic software for operating various application programs. The web server program 25b is an application program for the first server 20 to function as a web server. The first server control unit 21 generates a web page by using the web server program 25b.

The server-side control program 25c is an application program for controlling the printing device 40. The job information 25d stores one or more pieces of user information and stores the identification information of the virtual printer and one or more printing jobs in association with each of one or more pieces of user information.

Figure 4:
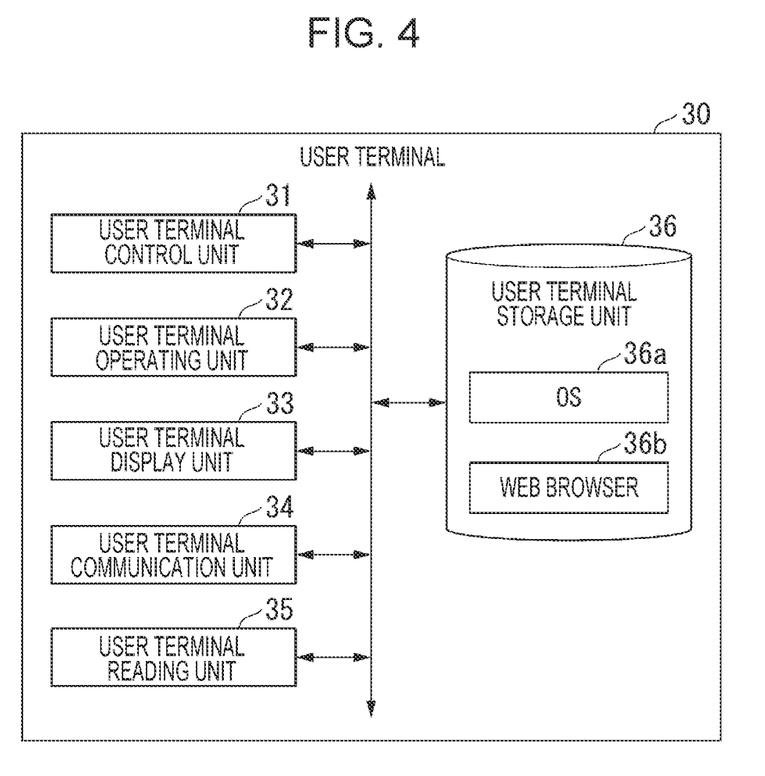
FIG. 4 is a block diagram illustrating a hardware configuration of a user terminal.

FIG. 4 is a block diagram illustrating the hardware configuration of the user terminal 30. The user terminal 30 includes a user terminal control unit 31, a user terminal operating unit 32, a user terminal display unit 33, a user terminal communication unit 34, a user terminal reading unit 35, and a user terminal storage unit 36.

The user terminal control unit 31 includes a processor such as a CPU, a ROM, a RAM, and the like, and controls each unit in the user terminal. The user terminal control unit 31 installs the authentication application, activates the installed authentication application, and registers the user information. The user terminal control unit 31 acquires the user information acquired by the user terminal reading unit 35 reading the QR code, and the address of the first server 20. The user terminal control unit 31 creates the printing request addressed to the address of the first server 20 and including the acquired user information, and transmits the created printing request to the first server 20 through the user terminal communication unit 34.

The user terminal operating unit 32 is, for example, a touch panel, and is used for operations such as an operation of installing the authentication application, an operation of causing the user terminal reading unit 35 to read the QR code, and an operation of creating the printing request. The user terminal display unit 33 is, for example, a liquid crystal display, and displays various types of information such as a screen for installing the authentication application and a screen for reading the QR code. The user terminal communication unit 34 communicates with the first server 20 via the network NW.

The user terminal storage unit 36 is, for example, an HDD, and stores an OS 36a, a web browser 36b, and the like. The OS 36a is basic software for operating various application programs. The web browser 36b is an application program for displaying web pages. The user terminal control unit 31 causes the user terminal display unit 33 to display, using the web browser 36b, various types of information such as a screen for transmitting the printing request to the printing device 40. The various types of information is provided by the first server 20 as a web page.

Figure 5:
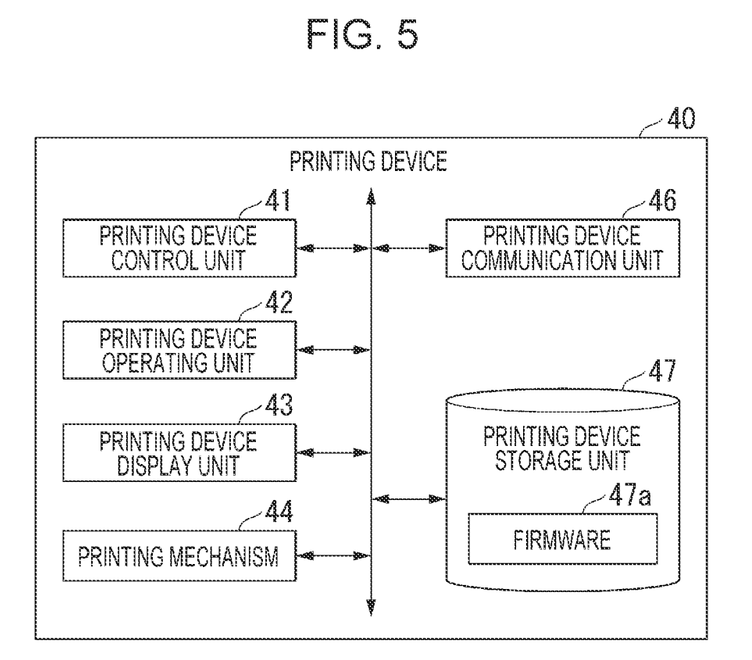
FIG. 5 is a block diagram illustrating a hardware configuration of a printing device.

FIG. 5 is a block diagram illustrating the hardware configuration of the printing device 40. The printing device 40 includes a printing device control unit 41, a printing device operating unit 42, a printing device display unit 43, a printing mechanism 44, a printing device communication unit 46, and a printing device storage unit 47.

The printing device control unit 41 includes a processor such as a CPU, a ROM, a RAM, and the like and controls each unit in the printing device 40. The printing device operating unit 42 is, for example, an operation panel and various buttons, and is used by the user to perform various operations on the printing device 40. The printing device display unit 43 is, for example, an operation panel, and displays various types of information such as the remaining amount in an ink cartridge and a status of the printing device 40.

The printing mechanism 44 is a mechanism for performing printing on a printing medium such as copier paper. The printing mechanism 44 includes an ink jet printing head, a head drive mechanism that drives a printing head, a printing medium transport mechanism that transports a printing medium, and the like.

The printing device communication unit 46 communicates with the first server 20. The printing device storage unit 47 is, for example, a flash memory, and stores firmware 47a and the like. The firmware 47*a* is a control program for controlling the printing device 40. The printing device control unit 41 uses this firmware 47*a* to control communication with the first server 20, control the printing mechanism 44, and the like.

Figure 6:
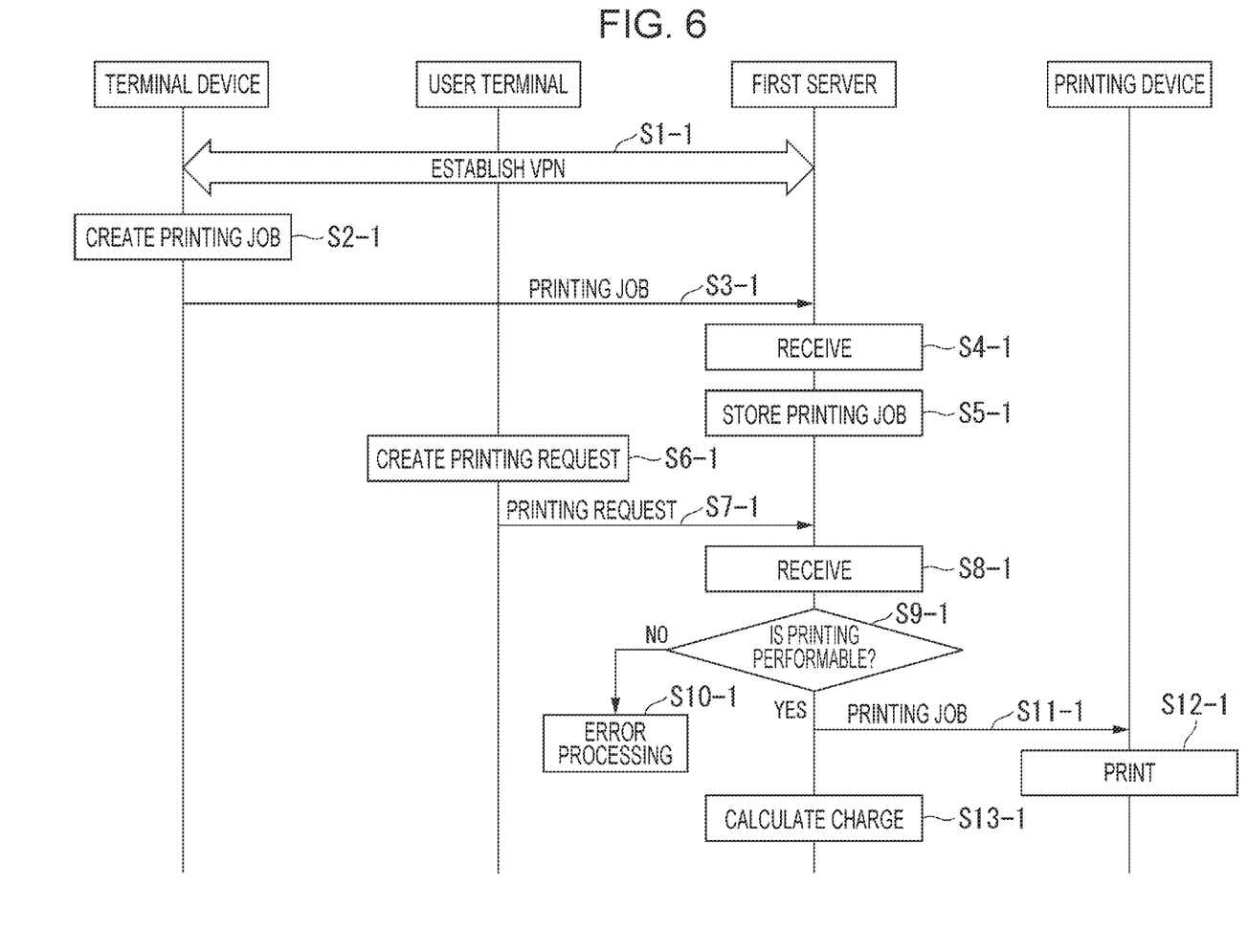
FIG. 6 is a flowchart illustrating an example of processing in the first information processing system.

FIG. 6 is a flowchart illustrating an example of processing in the first information processing system 1. A flow of a series of processes when causing the printing device 40 to perform printing in the first information processing system will be described with reference to FIG. 6. Here, the user operates the terminal device 10 outside the company to transmit the printing job from the terminal device 10 to the first server 20, and then the user operates the user terminal 30 to transmit the printing request from the user terminal 30 to the first server 20. It is assumed that the virtual printer that spools the printing job transmitted by the terminal device 10 via the VPN is set in the first server 20, and the user information, the identification information of the printing device 40, and the address information of the printing device 40 included in the registration request are associated with the virtual printer. In addition, it is also assumed that the user restriction and billing status of the printing device are set in association with the user information.

The terminal device 10 establishes VPN connection with the first server 20 (S1-1). In the terminal device 10, the terminal device control unit 11 creates the printing job including the user information and the printing data (S2-1). In the terminal device 10, the terminal device communication unit 14 transmits the printing job created by the terminal device control unit 11 to the first server 20 (S3-1). In the first server 20, the first server communication unit 23-1 receives the printing job transmitted by the terminal device 10 (S4-1). The first server control unit 21 acquires the printing job from the first server communication unit 23-1 and spools the printing job to the virtual printer associated with the user information based on the user information included in the acquired printing job (S5-1).

In the user terminal 30, the user terminal control unit 31 acquires the user information acquired by the user terminal reading unit 35 reading the QR code, and the address of the first server 20. The user terminal control unit 31 creates the printing request including the acquired user information and addressed to the address of the first server 20 (S6-1). In the user terminal 30, the user terminal communication unit 34 transmits the printing request to the first server 20 (S7-1).

In the first server 20, the second server communication unit 23-2 receives the printing request transmitted by the user terminal 30 (S8-1). In the first server 20, the first server control unit 21 acquires the printing request from the second server communication unit 23-2, and determines whether or not printing is not performable by determining whether or not there is a virtual printer associated with the user information based on the user information included in the acquired printing request (S9-1). When the first server control unit 21 determines that there is no virtual printer associated with the user information (S9-1: NO), the first server control unit 21 performs predetermined error processing (S10-1).

When the first server control unit 21 determines that there is a virtual printer associated with the user information (S9-1: YES), the first server control unit 21 changes a destination of the printing job spooled to the virtual printer associated with the user information to the printing device 40. The first server control unit 21 transmits the printing job with the changed destination to the printing device 40 through the second server communication unit 23-2 (S11-1). In the printing device 40, the printing device communication unit 46 receives the printing job transmitted by the first server 20. The printing mechanism 44 acquires the printing job from the printing device communication unit 46, and performs printing by processing the acquired printing job (S12-1). In the first server 20, the server management unit 22 manages the printing usage information for the user information. The server calculation unit 24 calculates the charge based on the printing usage information managed by the server management unit 22 to perform the billing processing (S13-1).

In the first information processing system 1 described above, the first server communication unit 23-1 may receive information indicating a usage condition for each of one or more pieces of user information. The first server control unit 21 may calculate the number of available sheets for each of one or more pieces of user information based on the usage condition for each of one or more pieces of user information received by the first server communication unit 23-1. The server management unit 22 may manage the number of printing sheets for a user corresponding to one or more pieces of user information based on the number of available sheets calculated by the first server control unit 21 for each of one or more pieces of user information.

The first server control unit 21 may determine whether or not the number of used sheets reached a used-sheet-number limit value, which is a limit value for the number of used sheets associated with each of one or more pieces of user information, for each of one or more pieces of user information based on the used-sheet-number limit value, and may create notification information for notifying a user corresponding to user information for which the number of used sheets reached the used-sheet-number limit value. Here, the used-sheet-number limit value may include a limit value for the number of used sheets for color printing and a limit value for the number of used sheets for monochrome printing. In addition, the first server control unit 21 determines whether or not a usage amount of money reached a usage-amount-of-money limit value, which is a limit value for the usage amount of money associated with each of one or more pieces of user information, for each of one or more pieces of user information based on the usage-amount-of-money limit value. The first server control unit 21 may create notification information for notifying a user corresponding to user information for which the usage amount of money reached the usage-amount-of-money limit value.

Further, the server storage unit 25 may store one or more pieces of user information in association with use authority information of each of one or more pieces of user information. The first server control unit 21 may acquire, from the server storage unit 25, the use authority information stored in association with the user information included in the printing request, and create, when the use authority information indicates that the user information does not have authority for use, notification information for notifying the user corresponding to the user information that does not have authority for use that printing is not performable.

As described above, in the first information processing system according to the embodiment, the first server 20 serving as an information processing device includes: the first server communication unit 23-1 serving as a first communication unit that receives the printing job including the user information; the server storage unit 25 serving as a storage unit that stores the printing job received by the first server communication unit 23-1; the second server communication unit 23-2 serving as a second communication unit that receives the printing request including the user information and the identification information of the printing device 40; the first server control unit 21 serving as a control unit that acquires, from the server storage unit 25, the printing job including the user information included in the printing request and sets a destination of the acquired printing job to the printing device corresponding to the identification information of the printing device included in the printing request; and the server management unit 22 serving as a management unit that manages the printing usage information for each of one or more pieces of user information, and the second server communication unit 23-2 transmits the printing job. When the printing job including the user information included in the printing request can be acquired, the destination of the acquired printing job can be set to the printing device corresponding to the identification information of the printing device included in the printing request, and therefore, unintended printing can be prevented.

In addition, the second server communication unit 23-2 receives the information indicating the usage condition for each of one or more pieces of user information, and the first server control unit 21 calculates the number of available sheets for each of one or more pieces of user information based on the usage condition for each of one or more pieces of user information received by the second server communication unit 23-2. Since the number of available sheets can be calculated for each of one or more pieces of user information based on the usage condition for each of one or more pieces of user information, it is possible to limit the number of available sheets of each of one or more pieces of user information.

Further, the first server 20 further includes the server calculation unit 24 serving as a printing charge calculation unit that calculates the printing charge based on the printing usage information managed by the server management unit 22. Since the printing charge can be calculated based on the printing usage information, the printing charge for the user can be billed.

Further, the identification information of the printing device included in the printing request is acquired by reading the QR code as an image representing the identification information of the printing device 40 by the user terminal reading unit 35 serving as a reading device. Since the identification information of the printing device can be acquired by the user terminal reading unit 35 reading the image representing the identification information of the printing device 40, the identification information of the printing device 40 can be acquired without the user inputting the identification information.

The first server control unit 21 determines whether or not the number of used sheets reached the used-sheet-number limit value, which is the limit value for the number of used sheets associated with each of one or more pieces of user information, for each of one or more pieces of user information based on the used-sheet-number limit value, and creates the notification information for notifying a user corresponding to user information for which the number of used sheets reached the used-sheet-number limit value. Since the notification information for notifying a user corresponding to user information for which the number of used sheets reached the used-sheet-number limit value can be created, it is possible to notify the user for which the number of used sheets reached the used-sheet-number limit value that the number of used sheets reached the used-sheet-number limit value.

Further, the used-sheet-number limit value includes the limit value for the number of used sheets for color printing and the limit value for the number of used sheets for monochrome printing. Since the used-sheet-number limit value can include the limit value for the number of used sheets for color printing and the limit value for the number of used sheets for monochrome printing, it is possible to notify a user for which the number of used sheets for color printing or monochrome printing reached the used-sheet-number limit value that the number of used sheets for color printing or monochrome printing reached the used-sheet-number limit value.

In addition, the first server control unit 21 determines whether or not the usage amount of money reached the usage-amount-of-money limit value, which is the limit value for the usage amount of money associated with each of one or more pieces of user information, for each of one or more pieces of user information based on the usage-amount-of-money limit value, and creates notification information for notifying a user corresponding to user information for which the usage amount of money reached the usage-amount-of-money limit value. Since the notification information for notifying a user corresponding to user information for which the usage amount of money reached the usage-amount-of-money limit value can be created, it is possible to notify the user for which the usage amount of money reached the usage-amount-of-money limit value that the usage amount of money reached the usage-amount-of-money limit value.

Further, the server storage unit 25 stores one or more pieces of user information and the use authority information of each of one or more pieces of user information in association with each other, and the first server control unit 21 acquires, from the server storage unit 25, the use authority information stored in association with the user information included in the printing request, and creates, when the use authority information indicates that the user information does not have authority for use, the notification information for notifying the user corresponding to the user information that does not have authority for use that printing is not performable. Since it is possible to create the notification information for notifying the user corresponding to the user information that does not have authority for use that printing is not performable, it is possible to notify the user who does not have authority for use that printing is not performable.

Second Embodiment

Figure 7:
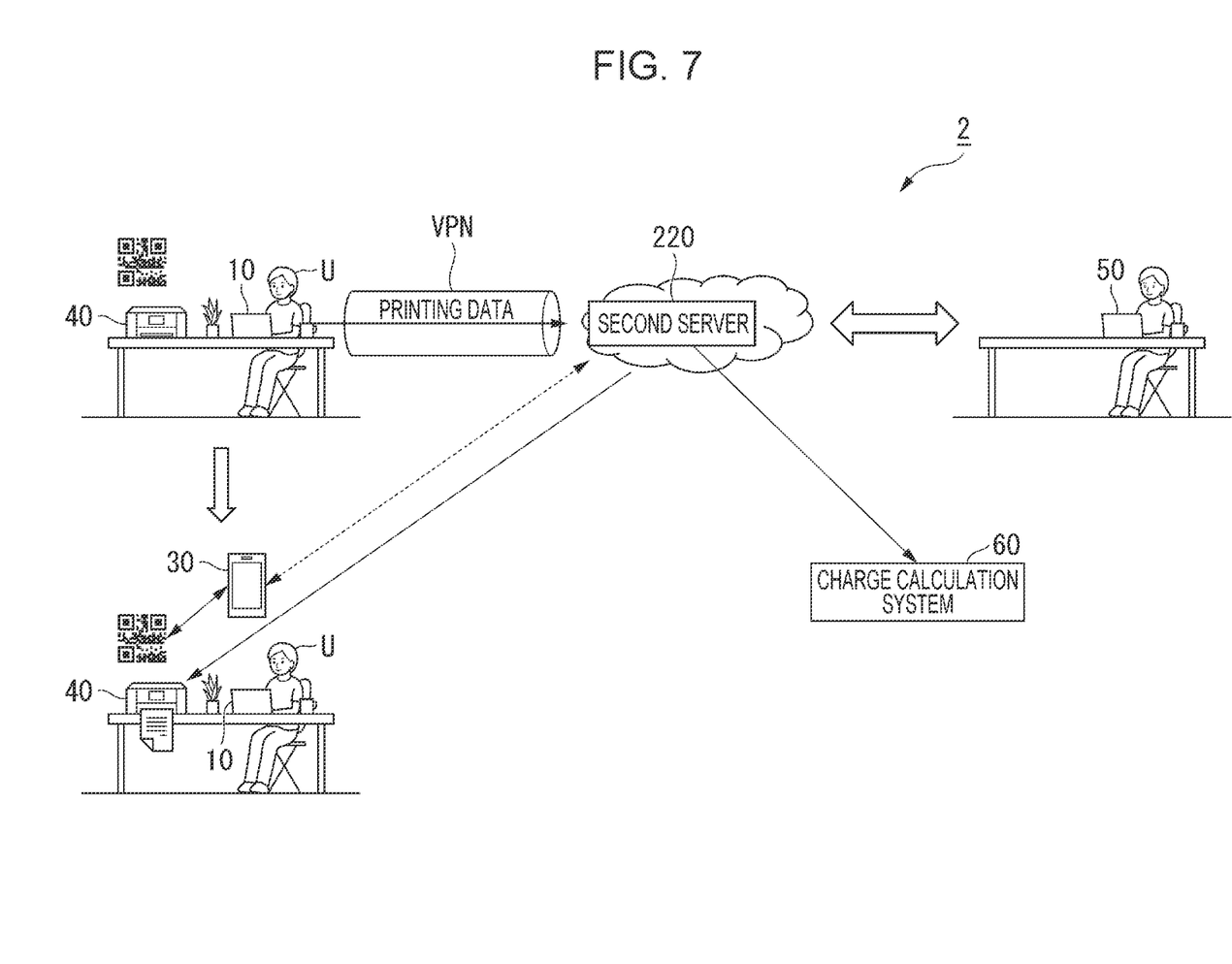
FIG. 7 is a diagram illustrating an example of a second information processing system according to a second embodiment.

Next, a second embodiment of the present disclosure will be described with reference to FIGS. 7 to 9. FIG. 7 is a diagram illustrating an example of a situation where a second information processing system according to the second embodiment is applied. The second information processing system 2 according to the second embodiment has a system configuration including a second server 220 instead of the first server 20 in the first information processing system 1 according to the first embodiment and further including a charge calculation system 60. In the following, points different from the first embodiment will be mainly described. In the present embodiment, the same components as those of the first embodiment will be denoted by the same reference signs, and a detailed description thereof will be omitted.

Figure 8:
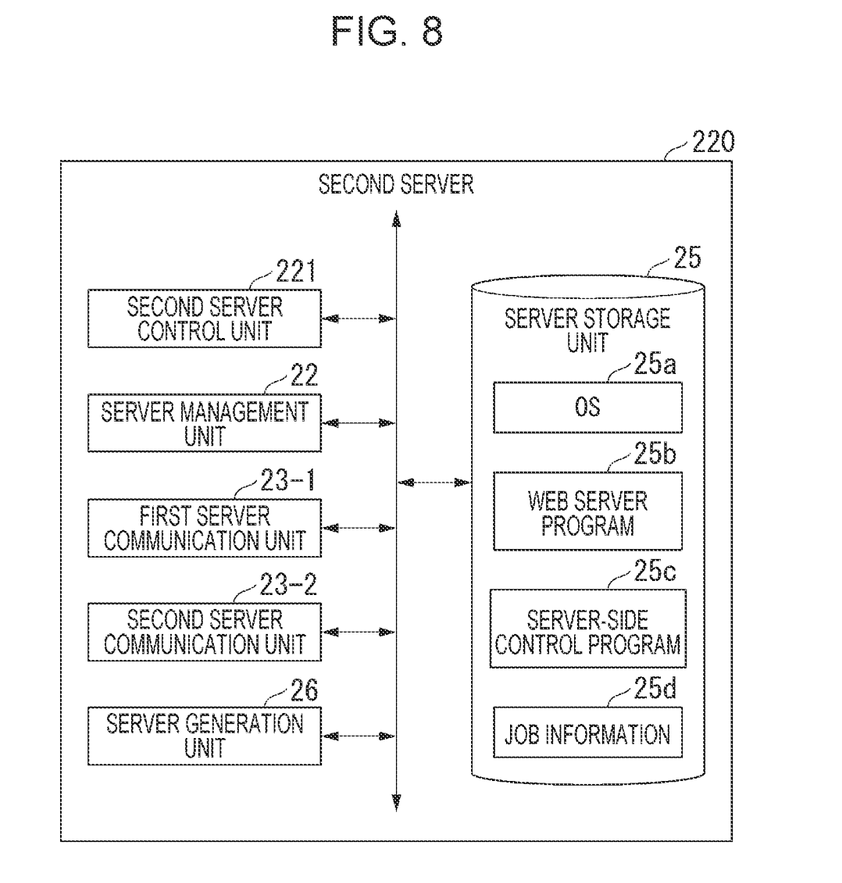
FIG. 8 is a block diagram illustrating a hardware configuration of a second server.

FIG. 8 is a block diagram illustrating a hardware configuration of the second server 220. The second server 220 includes a second server control unit 221, a server management unit 22, a first server communication unit 23-1, a second server communication unit 23-2, a server generation unit 26, and a server storage unit 25.

The server generation unit 26 generates log data for calculating a printing charge based on printing information such as a printing history managed by the server management unit 22. The second server control unit 221 has, in addition to the functions of the first server control unit 21, a function of creating log notification information addressed to the charge calculation system and including the log data generated by the server generation unit 26 and user information corresponding to the log data. The second server control unit 221 outputs the created log notification information to the first server communication unit 23-1. The first server communication unit 23-1 acquires the log notification output by the second server control unit 221 and transmits the acquired log notification to the charge calculation system 60. The charge calculation system 60 receives the log notification transmitted by the second server 220, and calculates a charge for a user corresponding to the user information based on the log data and user information included in the received log notification.

Figure 9:
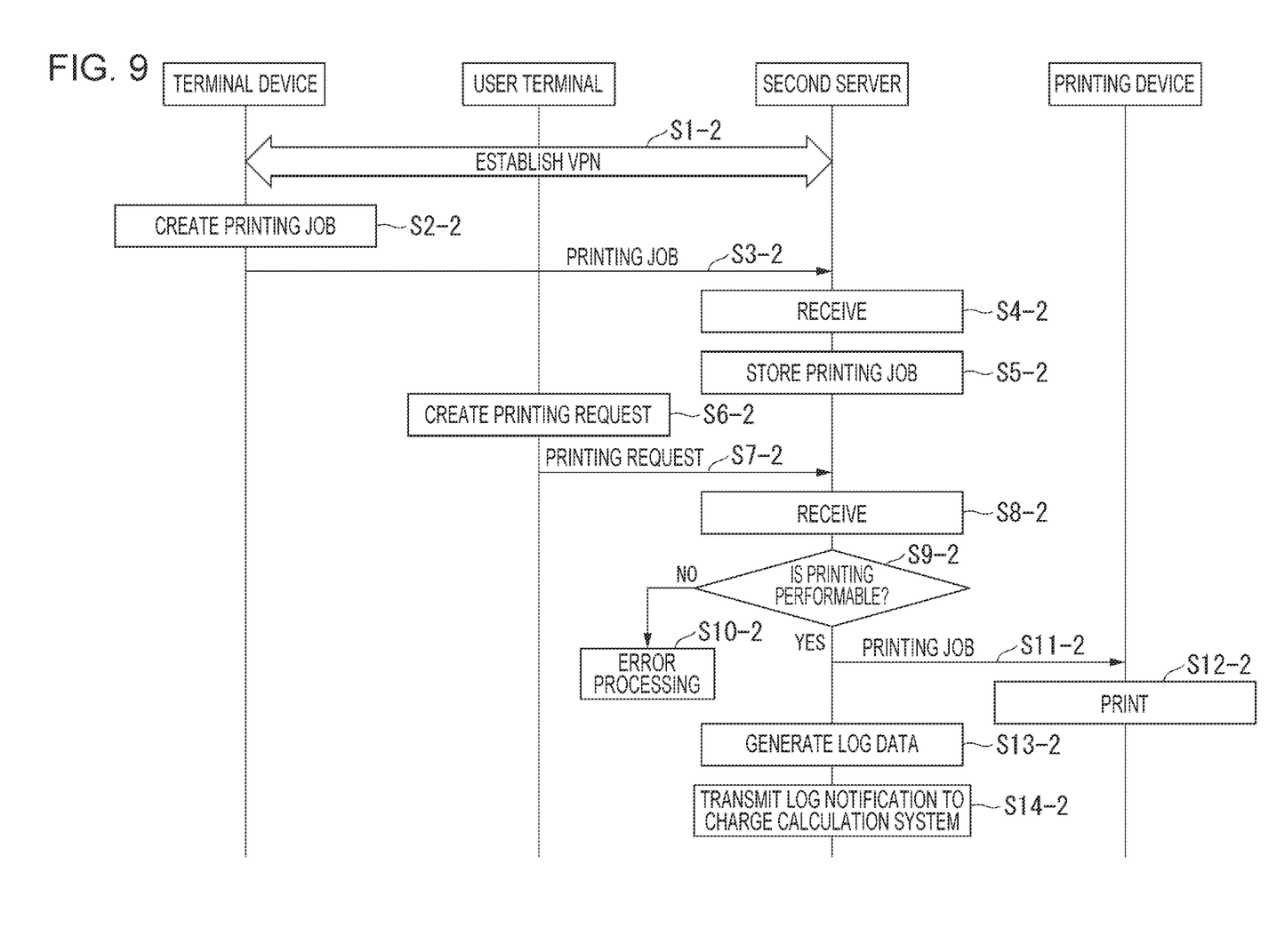
FIG. 9 is a flowchart illustrating an example of processing in the second information processing system.

FIG. 9 is a flowchart illustrating an example of processing in the second information processing system 2. A flow of a series of processes when causing a printing device 40 to perform printing in the second information processing system 2 will be described with reference to FIG. 9. Here, the user operates a terminal device 10 outside the company to transmit a printing job from the terminal device 10 to the second server 220, and then the user operates a user terminal 30 to transmit a printing request from the user terminal 30 to the second server 220. It is assumed that a virtual printer that spools the printing job transmitted by the terminal device 10 via a VPN is set in the second server 220, and the user information, identification information of the printing device 40, and address information of the printing device 40 included in a registration request are associated with the virtual printer. In addition, it is also assumed that a user restriction and billing status of the printing device are set in association with the user information.

The terminal device 10 establishes VPN connection with the second server 220 (S1-2). In the terminal device 10, a terminal device control unit 11 creates the printing job including the user information and printing data (S2-2). In the terminal device 10, a terminal device communication unit 14 transmits the printing job created by the terminal device control unit 11 to the second server 220 (S3-2). In the second server 220, the first server communication unit 23-1 receives the printing job transmitted by the terminal device 10 (S4-2). The second server control unit 221 acquires the printing job from the first server communication unit 23-1 and spools the printing job to the virtual printer associated with the user information based on the user information included in the acquired printing job (S5-2).

In the user terminal 30, a user terminal control unit 31 acquires the user information acquired by a user terminal reading unit 35 reading a QR code and an address of the second server 220. The user terminal control unit 31 creates the printing request including the acquired user information and addressed to the address of the second server 220 (S6-2). In the user terminal 30, a user terminal communication unit 34 transmits the printing request to the second server 220 (S7-2).

In the second server 220, the second server communication unit 23-2 receives the printing request transmitted by the user terminal 30 (S8-2). In the second server 220, the second server control unit 221 acquires the printing request from the second server communication unit 23-2, and determines whether or not printing is performable by determining whether or not there is a virtual printer associated with the user information based on the user information included in the acquired printing request (S9-2). When the second server control unit 221 determines that there is no virtual printer associated with the user information (S9-2: NO), the second server control unit 221 performs predetermined error processing (S10-2).

When the second server control unit 221 determines that there is a virtual printer associated with the user information (S9-2: YES), the second server control unit 221 changes a destination of the printing job spooled to the virtual printer associated with the user information to the printing device 40. The second server control unit 221 transmits the printing job to the printing device 40 through the second server communication unit 23-2 (S11-2). In the printing device 40, a printing device communication unit 46 receives the printing job transmitted by the second server 220. A printing mechanism 44 acquires the printing job from the printing device communication unit 46, and performs printing by processing the acquired printing job (S12-2).

In the second server 220, the server management unit 22 manages printing usage information for the user information. The server generation unit 26 generates the log data for calculating the printing charge based on the printing history managed by the server management unit 22 (S13-2). The second server control unit 221 creates the log notification information addressed to the charge calculation system and including the log data generated by the server generation unit 26 and the user information corresponding to the log data. The second server control unit 221 outputs the created log notification information to the first server communication unit 23-1. The first server communication unit 23-1 acquires the log notification output by the second server control unit 221 and transmits the acquired log notification to the charge calculation system 60 (S14-2).

As described above, the second information processing system 2 according to the embodiment further includes a generation unit as the server generation unit 26 that generates the log data for calculating the printing charge based on the printing history managed by the server management unit 22, in addition to the first information processing system 1. The second server control unit 221 creates the log notification information addressed to the charge calculation system and including the log data generated by the server generation unit 26 and the user information corresponding to the log data. The second server communication unit 23-2 transmits the log notification information to the charge calculation system. Since the log notification information addressed to the charge calculation system and including the log data generated by the server generation unit 26 and the user information corresponding to the log data can be created, it is possible to request the charge calculation system to calculate the charge.

A program for implementing the functions of any component in any device described above may be recorded in a computer-readable recording medium, and the program may be read and executed by a computer system. The "computer system" here includes an operating system or hardware such as a peripheral device. The "computer-readable recording medium" refers to a portable medium such as a flexible disc, a magneto-optical disc, a ROM, or a compact disc (CD)-ROM, or a storage device such as a hard disk embedded in the computer system. The "computer-readable recording medium" refers to a recording medium that holds the program for a certain period of time, such as a volatile memory inside the computer system that serves as a server or client when the program is transmitted via a network such as the Internet or a communication line such as a telephone line. The volatile memory may be a RAM. The recording medium may be a non-transitory recording medium.

The program described above may be transmitted from the computer system that stores the program in a storage device or the like to another computer system via a transmission medium or by transmission waves in a transmission medium. The "transmission medium" for transmitting the program refers to a medium having a function of transmitting information, for example, a network such as the Internet or a communication line such as a telephone line. The program described above may be a program for implementing some of the functions described above. The program described above may be a so-called differential file, which can implement the functions described above in combination with a program already recorded in the computer system. The differential file may also be referred to as a differential program.

The functions of any component in any device described above may be implemented by a processor. Each processing in the embodiment may be implemented by the processor that operates based on information such as the program and the computer-readable recording medium that stores the information such as the program. The functions of the respective units of the processor may be implemented by separate hardware or may be implemented by integrated hardware. The processor includes hardware, and the hardware may include at least one of a circuit for processing a digital signal or a circuit for processing an analog signal. The processor may be implemented by using one or more circuit devices or one or more circuit elements mounted on a circuit board or by using both of one or more circuit devices and one or more circuit elements. An integrated circuit (IC) or the like may be used as the circuit device, and a resistor, a capacitor, or the like may be used as the circuit element.

The processor may be a CPU. However, the processor is not limited to a CPU, and various processors such as a graphics processing unit (GPU) and a digital signal processor (DSP) may be used. The processor may be a hardware circuit based on an application specific integrated circuit (ASIC). The processor may be implemented by a plurality of CPUs or may be implemented by hardware circuits based on a plurality of ASICs. The processor may be implemented by a combination of a plurality of CPUs and hardware circuits based on a plurality of ASICs. The processor may include one or more of an amplifier circuit, a filter circuit, and the like that process an analog signal.

Hereinabove, the embodiments have been described in detail with reference to the drawings, but the specific configuration is not limited to the embodiments and includes design and the like within the scope of the present disclosure.

What is claimed is:

1. An information processing device comprising:
a first communicator that receives a printing job including user information;
a storage that stores the printing job received by the first communicator;
a second communicator that receives a printing request including the user information and identification information of a printing device; and
a processor that
spools the printing job to a virtual printer associated with the user information included in the printing job in response to acquiring the printing job from the first communicator,
determines whether there is a virtual printer associated with the user information included in the printing request in response to acquiring the printing request from the second communicator,
sets a destination of the printing job that has been spooled to the virtual printer to the printing device corresponding to the identification information of the printing device included in the printing request in response to determining that there is a virtual printer associated with the user information included in the printing request,
transmits the printing job to the printing device via the second communicator, and
manages printing usage information for each of one or more pieces of user information.

2. The information processing device according to claim 1, further comprising
a generator that generates log data for calculating a printing charge based on a printing history managed by the processor, wherein
the processor creates log notification information addressed to a charge calculation system and including the log data generated by the generator and the user information corresponding to the log data, and
the second communicator transmits the log notification information to the charge calculation system.

3. The information processing device according to claim 1, wherein
the second communicator receives, from an information processing system, information indicating a usage condition for each of the one or more pieces of user information, and
the processor calculates a number of available sheets for each of the one or more pieces of user information based on the usage condition for each of the one or more pieces of user information received by the second communicator.

4. The information processing device according to claim 1, further comprising
a printing charge calculator that calculates a printing charge based on the printing usage information managed by the processor.

5. The information processing device according to claim 1, wherein
the identification information of the printing device included in the printing request is acquired by a reading device reading an image representing the identification information of the printing device.

6. The information processing device according to claim 1, wherein
the processor determines whether or not a number of used sheets reached a used-sheet-number limit value, which is a limit value for the number of used sheets associated with each of the one or more pieces of user information, for each of the one or more pieces of user information based on the used-sheet-number limit value, and creates notification information for notifying a user corresponding to the user information for which the number of used sheets reached the used-sheet-number limit value.

7. The information processing device according to claim 6, wherein
the used-sheet-number limit value includes a limit value for a number of used sheets for color printing and a limit value for a number of used sheets for monochrome printing.

8. The information processing device according to claim 1, wherein
the processor determines whether or not a usage amount of money reached a usage-amount-of-money limit value, which is a limit value for the usage amount of money associated with each of the one or more pieces of user information, for each of the one or more pieces of user information based on the usage-amount-of-money limit value, and creates notification information for notifying a user corresponding to the user information for which the usage amount of money reached the usage-amount-of-money limit value.

9. The information processing device according to claim 1, wherein
the storage stores the one or more pieces of user information and use authority information of each of the one or more pieces of user information in association with each other, and
the processor acquires, from the storage, the use authority information stored in association with the user information included in the printing request, and creates, when the use authority information indicates that the user information does not have authority for use, notification information for notifying a user corresponding to the user information not having authority for use that printing is not performable.

10. An information processing system comprising:
a terminal device;
a mobile terminal; and
an information processing device that performs communication with the terminal device and the mobile terminal, wherein
the terminal device creates a printing job including user information and transmits the created printing job to the information processing device,
the mobile terminal creates a printing request including the user information and an identification information of a printing device and transmits the created printing request to the information processing device,
the information processing device includes
a first communicator that receives the printing job,
a storage that stores the printing job received by the first communicator,
a second communicator that receives the printing request,
a processor that
spools the printing job to a virtual printer associated with the user information included in the printing job in response to acquiring the printing job from the first communicator,
determines whether there is a virtual printer associated with the user information included in the printing request in response to acquiring the printing request from the second communicator,
sets a destination of the printing job that has been spooled to the virtual printer to the printing device corresponding to the identification information of the printing device included in the printing request in response to determining that there is a virtual printer associated with the user information included in the printing request,
transmits the printing job to the printing device via the second communicator, and
manages printing usage information for each of one or more pieces of user information.

11. An information processing method executed by an information processing system including a terminal device, a mobile terminal, and an information processing device that performs communication with the terminal device and the mobile terminal, the information processing method comprising:
creating, by the terminal device, a printing job including user information and transmitting, by the terminal device, the created printing job to the information processing device;
creating, by the mobile terminal, a printing request including the user information and an identification information of a printing device and transmitting, by the mobile terminal, the created printing request to the information processing device;
receiving, by a first communicator of the information processing device, the printing job;
storing, by a storage of the information processing device, the received printing job in a storage;
receiving, by a second communicator of the information processing device, the printing request;
spooling, by a processor of the information processing device, the printing job to a virtual printer associated with the user information included in the printing job in response to acquiring the printing job from the first communicator,
determining, by the processor of the information processing device, whether there is a virtual printer associated with the user information included in the printing request in response to acquiring the printing request from the second communicator,
setting, by the processor of the information processing device, a destination of the printing job that has been spooled to the virtual printer to the printing device corresponding to the identification information of the printing device included in the printing request in response to determining that there is a virtual printer associated with the user information included in the printing request,
transmitting, by the processor of the information processing device, the printing job to the printing device via the second communicator, and
managing, by the processor of the information processing device, printing usage information for each of one or more pieces of user information.

* * * * *